June 10, 1930.  G. J. MEAD  1,763,099

SKIVING DEVICE

Filed Nov. 27, 1926

George J. Mead
Inventor
By
Attorney

Patented June 10, 1930

1,763,099

UNITED STATES PATENT OFFICE

GEORGE J. MEAD, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

SKIVING DEVICE

Application filed November 27, 1926. Serial No. 151,095.

My invention relates to the manufacture of rubber tubes, such as are used in pneumatic tire casings, and more particularly to means for skiving the ends of such tubes while they are on the poles or mandrels upon which they are later vulcanized.

According to one method of manufacturing such tubes the latter are cut to length after they are in position on the mandrel and the ends are sealed by the application of a suitable cement. For later splicing of the ends of the cured tube to form an annulus it is necessary that the ends of the tubes be skived or beveled in order that the joint shall not be of undue thickness.

In prior practice it has been customary to bind the ends of the tube with tape or a metal clamp which tapers the ends of the tube by compressing the plastic stock but where the ends of the tube are sealed to the mandrel with cement no compression is applied. It is an object of my invention to accomplish the skiving or tapering of the ends of the tubes while the latter are on the mandrel and in an uncured state.

In the accompanying drawings which illustrate one embodiment of my invention—

Figure 1:
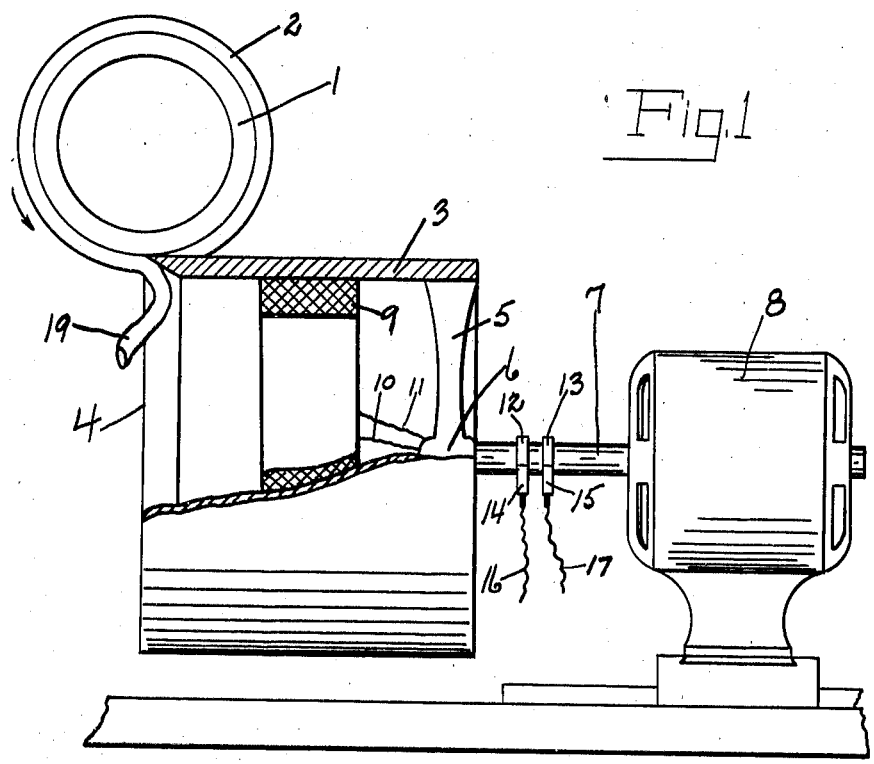
Figure 2:
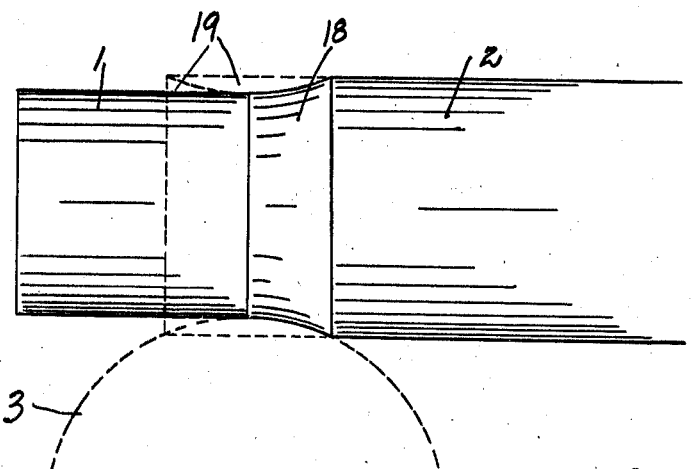

Figure 1 is a view partly in section showing the skiving device in operative relation with the tube and mandrel, and Figure 2 is a side view of the skived tube.

Referring to the drawings 1 designates the mandrel upon which the raw tube 2 is supported. The skiving knife takes the form of a hollow cylinder 3 having a cutting edge 4 and provided at the opposite end with spokes 5 and hub 6 the latter secured to the shaft 7 of an electric motor. The knife 3 is heated by an electrical heating element 9 positioned inside of the cylinder, and connected by leads 10 and 11 passing through hub 6 to rings 12 and 13 formed on shaft 7. Brushes 14 and 15, connected by leads 16 and 17 to any source of suitable current, not shown, contact with rings 12 and 13 to supply current to heat the element 9.

In operation the cylindrical knife, while rotating at high speed, is brought into contact with the tube, as shown in Figure 1, and the mandrel and tube rotated about their longitudinal axis toward the knife as shown by the arrow in Figure 1. Since the cylindrical knife is of substantial diameter the result is that a groove of wide curvature is cut in the tube adjacent its end and substantially through the stock, the portions indicated in dotted lines at 19 in the latter figure being cut away leaving the end of the tube skived in a relatively long curve as shown at 18. Since the scrap is uncured it may be returned to the warming mill and reworked.

I claim:

1. A device for skiving the ends of raw rubber tubes which comprises a rotary tube supporting mandrel, a cylindrical cutting member positioned at right angles to and in tangent relation to the mandrel and having a degree of curvature substantially equal to that of the skive desired on the tube, and means to rotate the cutter about its longitudinal axis.

2. A device for skiving the ends of raw rubber tubes which comprises a rotary tube supporting mandrel, a cylindrical member interiorly beveled at one end to form a cutting edge positioned at right angles to and in tangent relation to the mandrel, the degree of curvature of the cylinder being substantially equal to that of the skive desired on the tube, and means to rotate the cylinder about its longitudinal axis.

3. A device for skiving the ends of raw rubber tubes which comprises a rotary tube supporting mandrel, a cylindrical cutting member positioned at right angles to and in tangent relation to the mandrel and having a degree of curvature substantially equal to that of the skive desired on the tube, means to rotate the cutter about its longitudinal axis and means to heat the cutter during its rotation.

In testimony whereof I have signed my name to the above specification.

GEORGE J. MEAD.